April 18, 1961 R. J. BAGDON ET AL 2,980,572
METHOD OF MAKING A SHIM
Filed Nov. 30, 1956

United States Patent Office 2,980,572
Patented Apr. 18, 1961

2,980,572

METHOD OF MAKING A SHIM

Richard J. Bagdon, Los Altos, and Raymond Warren, Redwood City, Calif., assignors to Laminated Shim Company, Inc., Glenbrook, Conn.

Filed Nov. 30, 1956, Ser. No. 625,356

2 Claims. (Cl. 154—116)

This invention relates to improvements in laminated shims and to an improved method for their manufacture.

Shim laminations (some of which may be very thin, in the order of .001″ or .002″ thick) are difficult to align and to handle, if loose. Therefore, various methods have been used to secure them together temporarily, either (as shown in the Patent 2,566,249) by tabs that were cemented together, by spots of solder, or by actually cementing the lamination faces to each other. However, for many uses, especially with aluminum laminations, all these methods are unsatisfactory. Often, the shim must be installed in places where there is no room for a tab, even temporarily. Thin sheets of aluminum cannot be soldered without distorting them disastrously. If lamination faces are cemented to each other, the thin aluminum leaves tend to be torn apart upon removal; this has meant that once the sheets were torn off they could not be replaced, and replacement is often necessary, since the estimate of how many laminations should be removed may be too great and some laminations must then be put back on.

The problems have become especially severe with the use of very thin aluminum laminations. Aluminum is more difficult to handle than brass; it cannot be soldered and tears easily. For that reason, the invention will be described with reference to the use of aluminum stock, although it applies to the other types of shim stock.

Generally speaking, this invention comprises securing together the shim laminations only along their edges, by a very thin film of elastic cement, that is, cement which includes enough rubber or synthetic rubber to make it stretchable instead of being brittle, because if it is brittle it will break if it is dropped and some laminations will fall off.

Other objects and advantages of the invention will appear from the following description of a preferred embodiment, given as an example.

Figure 1:
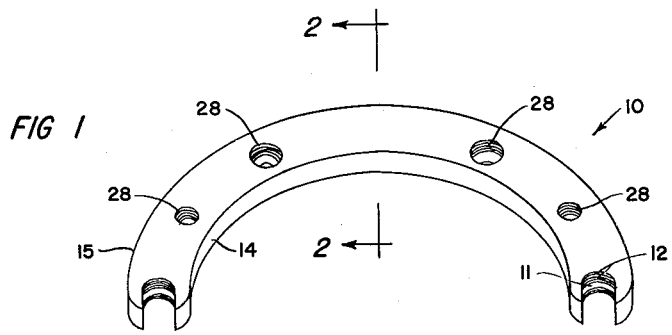
Fig. 1 is a view in perspective of a laminated shim embodying the principles of the present invention.
Figure 2:
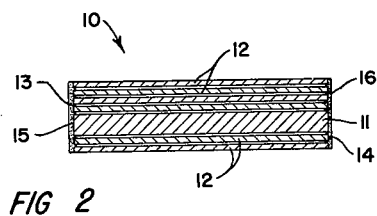
Fig. 2 is a view in section taken along the line 2—2 in Fig. 1 with thicknesses and spacing greatly enlarged, the actual laminations being only about one or two thousandths of an inch thick and the spacing less than one ten-thousandth of an inch.
Figure 4:
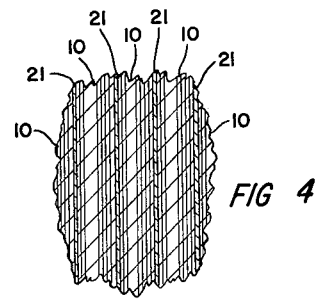
Fig. 4 is a view in elevation and in section of part of a stack of shim assemblies showing the interleaving between shims.
Figure 3:
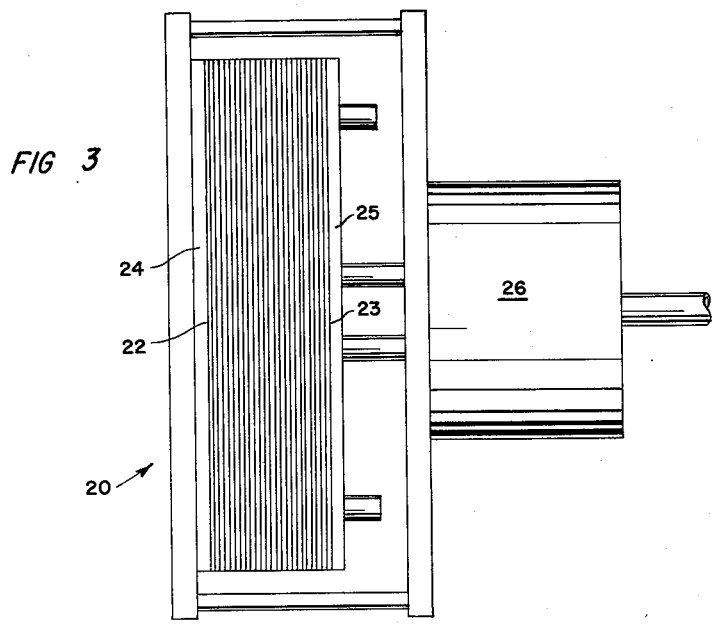
Fig. 3 is a view in side elevation of a stack of shim assemblies clamped together for application of the cement.

As shown in Figs. 1 and 2, a shim 10 embodying this invention may be made up of a plurality of sheets 11 and 12 of sheet aluminum properly cut to shape and punched. One or a few sheets 11 may be relatively thick, but most of the sheets 12 are very thin gauge aluminum, the use of three different thicknesses in each shim 10 being not uncommon. A thick sheet 11 may form the central or nearly central portion of the shim 10, with very thin sheets 12 on each side of it. When installed and checked for the thickness against the clearance between the parts that are to be spaced by the shim 10, the assembler can tell about how much too thick the shim is. Then, he may remove one or several thin laminations, usually in groups, until the desired thickness is reached. If he finds that he has removed too many laminations, he puts back one or more laminations until the thickness is just right.

In this invention, the shim laminations 11 and 12 are held assembled to each other by cement 13 applied only along the edges 14 and 15. A very small amount 16 of cement 13 may happen to work its way in between some laminations near the edges, but it is important to keep the cement 13 from spreading out in between the lamination faces, because the thin aluminum sheets would then be destroyed on stripping and could not be replaced when additional thickness was found to be necessary. The application of the cement at the edge only overcomes that difficulty.

The cement itself must have plastic qualities. A cement including Buna-N rubber (butadiene-acrylonitrile copolymer, a synthetic elastomer), such as "Pliobond" cement, has been found satisfactory, as are other adhesives having enough synthetic rubber in them so that they are not brittle. If they are brittle, the shim 10 will tend to fall apart when it is dropped and the force then placed on the aluminum sheets will tend to tear them, whereas with elastic cement there is no such difficulty. The use of cement having such elasticity is therefore considered essential.

The method of making the shims 10 begins with stacking the cut and punched shim laminations 11 and 12 in a suitable jig 20 to make shim assemblies; no cement is used in this stage; the laminations 11 are loose. As soon as each shim assembly has been stacked, a piece of wax paper 21, or similar interleaving material which will not stick to the cement is placed on top of the shim assembly 10 and another shim assembly 10 stacked up over it. This is continued; a series of shim assemblies being stacked on each other, separated in each instance by an interleaving sheet 21 of material which does not adhere readily to the cement.

Once a convenient stack, say 6″ to 8″ high, of shim assemblies has been placed in the jig 20, pressure is applied to the faces 22 and 23 at opposite ends of the stack, as by metal plates 24 and 25 and a hydraulic press 26, so as to compress it together rather tightly. The clamp is not, however, tightened fully because it is desirable that some small amount 16 of cement 13 along one edge 14 penetrate a very short distance in between the laminations 11 and 12. Cement 13 (e.g., "Pliobond" cement containing Buna-N) is then either brushed or sprayed on that one side edge 14. It adheres mainly to the outside, though a small amount 16 may get in between the sheets at the edge without, however, affecting the clearance space or total shim thickness in any noticeable manner, so that the total amount which gets in between all the laminations must be considerably less than .001″ or .002″ for the total thickness of each shim 10.

When the one edge 14 has been covered with cement 13, the shim assemblies are further compressed or tightened as by the application of the hydraulic press 26 with about 25 pounds of pressure. Any excess cement 13 is squeezed out at this time and the application of the next cement will not send cement in between the sheets. When the shims are tightened, cement 13 is brushed along the other edge 15 or edges, constituting a minor adhesion which keeps the laminations 11 and 12 from falling apart but makes it easy to separate them with a razor blade once they are assembled.

After this application, the cement 13 is then dried, preferably by air. When dried, the pressure is removed from the ends 22 and 23 of the stack and the shims 10 are unstacked. Each shim assembly 10 will then be held together by the cement while the separate shims 10 do not stick together because they have been separated by the interleaving sheets 21.

In use, each shim 10 is placed on one of the two members it is to be used between, being aligned by bolts that extend through the holes 28 and are used to tighten the two machine parts together. The assembler checks the thickness necessary at this point and if he finds that it is excessive, as it will usually be, he removes as many thin laminations 12 as necessary to correct the excess. He does not have to remove them one at a time; he may insert a razor blade in to break the bond of the cement 13 at any one point and pull off an estimated thickness, usually of several laminations 12. If he finds that he has removed too much, he may restore one or more laminations 12. If, on the other hand he finds that he needs to remove more sheets 12, he can do that as well. The removal is very simple; the razor blade is inserted to lift a corner and then the group of laminations 12 is peeled off from the remaining laminations. They come off very easily without tearing because of only a very narrow edge of cement 13 holding them together. On the other hand, they do remain in place even with relatively rough handling until the stripping is done.

To those skilled in the art to which this invention relates, many additional changes in construction and widely differing embodiments of the invention will suggest themselves without departing from the spirit and scope of the invention as defined in the claims.

What is claimed is:

1. A method for making laminated shims from thin sheet aluminum shim stock comprising the steps of stacking a series of preformed laminations of said shim stock to form a shim assembly, placing a piece of interleaving material over said shim assembly, stacking successively other shim assemblies, separating each from the other by interleaving sheets, clamping a stack of a multiplicity of said shim assemblies together, applying synthetic rubber cement along one edge only of said stack, tightening the clamp further to force out any cement that may get in between the faces, and coating other edges of said stack with said cement, drying said cement and disassemblying said stack so as to remove the interleaving sheets.

2. A method for making laminated shims from thin sheet shim stock comprising the steps of stacking a series of preformed laminations of said shim stock to form a shim assembly, placing a piece of interleaving material over said shim assembly, stacking successively other shim assemblies, separating each from the other by interleaving sheets, clamping a stack of a multiplicity of said shim assemblies together, applying cement along one edge only of said stack, tightening the clamp further to force out any cement that may get in between the faces, and coating other edges of said stack with said cement, drying said cement and disassembling said stack so as to remove the interleaving sheets.

References Cited in the file of this patent

UNITED STATES PATENTS

| | | |
|---|---|---|
| 1,457,625 | Freydberg | June 5, 1923 |
| 1,768,652 | Yordon | July 1, 1930 |
| 1,951,730 | Johnson | Mar. 20, 1934 |
| 2,106,385 | Springer | Jan. 25, 1938 |
| 2,124,866 | Young | July 26, 1938 |
| 2,234,214 | Young | Mar. 11, 1941 |
| 2,542,405 | Fink | Feb. 20, 1951 |
| 2,566,249 | Rainey et al. | Aug. 28, 1951 |
| 2,597,888 | Miller | May 27, 1952 |

FOREIGN PATENTS

| | | |
|---|---|---|
| 562,795 | Great Britain | July 17, 1944 |
| 577,354 | Great Britain | May 15, 1946 |
| 125,258 | Australia | Sept. 4, 1947 |